(12) United States Patent
Orth et al.

(10) Patent No.: US 6,434,320 B1
(45) Date of Patent: Aug. 13, 2002

(54) METHOD OF SEARCHING RECORDED DIGITAL VIDEO FOR AREAS OF ACTIVITY

(75) Inventors: Jeffrey J. Orth, Fenton; James Carrol Myers, Florissant, both of MO (US)

(73) Assignee: Comtrak Technologies, LLC, Hazelwood, MO (US)

( * ) Notice: Subject to any disclaimer, the term of this patent is extended or adjusted under 35 U.S.C. 154(b) by 0 days.

(21) Appl. No.: 09/687,316

(22) Filed: Oct. 13, 2000

(51) Int. Cl.$^7$ ................................................ H04N 5/91
(52) U.S. Cl. ......................................... 386/68; 386/111
(58) Field of Search ............................... 386/46, 68, 95, 386/111, 125, 126, 81, 82, 117; 382/236; H04N 5/91

(56) References Cited

U.S. PATENT DOCUMENTS

| | | | |
|---|---|---|---|
| 4,318,137 A | * 3/1982 | Cordova et al. | 386/117 |
| 5,864,646 A | * 1/1999 | Searby | 386/68 |
| 6,009,204 A | * 12/1999 | Ahmad | 382/236 |

* cited by examiner

*Primary Examiner*—Huy Nguyen
(74) *Attorney, Agent, or Firm*—Polster, Lieder, Woodruff & Lucchesi, LC

(57) ABSTRACT

A method of scanning recorded video images of a scene to locate those images in which there is a predetermined amount of activity. Images (I) of the scene are obtained over a period of time. Each of the images (SI) is compared to a reference image (RI) of the scene and a difference image (DI) is created for each comparison. A threshold test is applied to each image as a measure of the activity occurring in the scene at the time the image is obtained and the results of the test are stored with the image in a memory (18) of an image processing system (10). When the images are subsequently viewed, a viewing threshold related to the amount of activity occurring in the scene is established by the viewer. The test results for each stored image are then scanned to determine if the image meets the viewing criteria. If it does, the image is either displayed for viewing on a monitor (24) or a file (F2) is created for analysis. Since the viewing threshold criteria can be rapidly determined for a large number of stored images, it is not necessary to view the images in their sequential order. This saves a substantial amount of time and allows the user to quickly locate pertinent information related to activities at a monitored site.

25 Claims, 2 Drawing Sheets

METHOD OF SEARCHING RECORDED DIGITAL VIDEO FOR AREAS OF ACTIVITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to video image processing, and more particularly, to a method of searching recorded video images to quickly locate areas of activity recorded on the video.

In video recording systems, for example those used for surveillance of a premises, a camera obtains a series of video images of a scene. These images are processed by an image processing system and the results stored in a digital video recorder (DVR) or the like. The images are stored sequentially; i.e., the first image obtained first, the second image obtained second, and so forth. The images are usually digitally converted analog signals, and these digital images are stored in a computer memory or on a disc. Most surveillance systems are used at times when little activity is expected within the scene viewed by the camera. Accordingly, the recorded video will typically have lengthy segments where there is no change in the recorded image or there may be small changes due to environmental disturbances such as video monitor screen savers, oscillating fans, or any of a number of other disturbances.

A drawback in conventional recording systems, is that in order to view segments of the video in which "interesting" activity has occurred and been recorded, it is necessary to move through all the images in their sequence of recording. That is, the sequence of recorded images stored in a memory is queued into a computer display input. The operator then pushes a PLAY button and the computer serially sequences through the stored images. The operator must watch all the images until one is reached that has activity of interest. The present invention solves this problem by a method that allows recorded video to be rapidly scanned with the scanning stopping only at those images where a change in the activity recorded exceeds a predetermined threshold.

BRIEF SUMMARY OF THE INVENTION

Among the several objects of the present invention may be noted the provision of a method of scanning recorded video images of a scene to rapidly locate those images in which there is a predetermined amount of activity. The method involves first obtaining images of a scene over a period of time. One of the images is designated a reference image of the scene and the other images are compared to this reference one at a time. The reference image is periodically updated as conditions warrant. A difference image is created for each comparison of an image to the reference image, and the difference images are stored in a memory of the system. A threshold test is applied to each difference image as a measure of the activity occurring in the scene at the time the image is obtained and the results of the test are stored with the image. When the images are to be subsequently viewed, a viewing threshold related to the amount of activity occurring in the scene is established by the viewer. Information stored with each image is then scanned to determine which images meet the viewing criteria. Those images that do are either displayed, in time sequence, for viewing or used to create a separate file for analysis. Since the viewing threshold criteria can be rapidly determined for a large number of stored images, it is not necessary to view the images in their sequential order which saves a substantial amount of time and allows the user to quickly locate pertinent information related to activities at a monitored site. Other objects and features will be in part apparent and in part pointed out hereinafter.

BRIEF DESCRIPTION OF THE SEVERAL VIEWS OF THE DRAWINGS

In the drawings.

Corresponding reference characters indicate corresponding parts throughout the drawings.

DETAILED DESCRIPTION OF THE INVENTION

Figure 1:
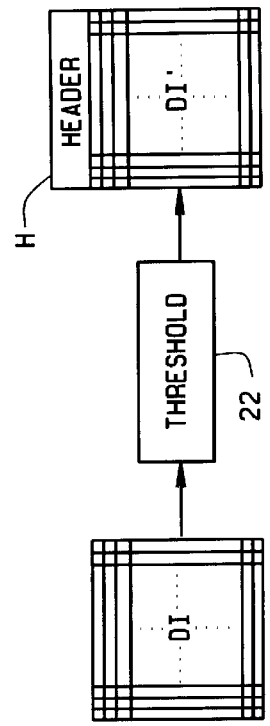
FIG. 1 is a simplified block diagram of an image processing system.

Referring to the drawings, an image processing system of the present invention is indicated generally 10. A camera 12 obtains video images of a scene and provides as an output an analog signal A. This analog signal is supplied as an input to an analog-to-digital converter 14 which converts signal A to a digital signal D. The digital signal is supplied to a signal processor 16 which processes the signal in a manner described hereinafter. After processing, the video images are stored in a memory 18 which can be a computer memory, a computer hard drive, a CD, or other data storage media. Those skilled in the art will understand that while system 10 is shown to include a video camera 12, other imaging devices, for example, an infrared (IR) detector can also be used to obtain images which are processed in accordance with the method of the present invention.

Figure 2:
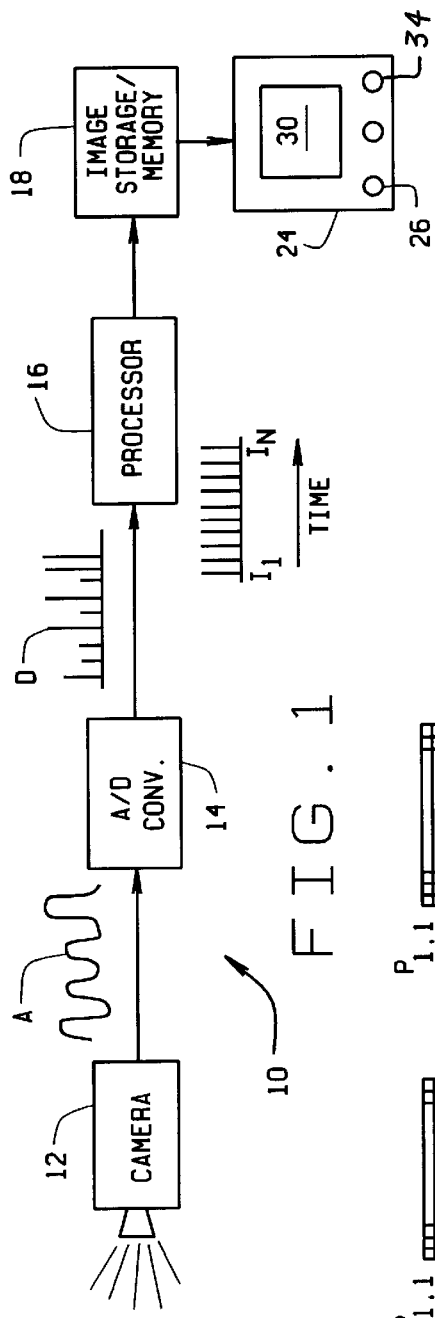
FIG. 2 illustrates the comparison of a reference video image to another video image to produce a difference image.

As shown in FIG. 1, image processing system 10, over time, captures and stores a series of images $I_1$–$I_N$. One of these images is periodically designated a reference image RI by the system. Each reference image represents a view of the scene at a given point in time. Images SI obtained subsequent in time to the reference image are compared with the reference image by processor 16. This comparison is done to determine which portions of the scene being observed have changed. This knowledge can be used by a digital video recorder (DVR) to reduce the amount of storage required for the entire sequence of images. However, the current invention relies on this information to aid in the viewing of the image sequence regardless of the method of storage. As shown in FIG. 2, processor 16 includes a comparator 20 having as one input the reference image RI and as a second input, a subsequent image SI. The two images are of the same size; that is, they have the same number of pixels arranged in an identical format of M rows and N columns. Because of this, comparator 20, can readily compare the two images to determine if there is any difference between them. The comparator does this by first comparing the pixel values represented by the data bits at locations RI, $p_{1,1}$ and SI, $p_{1,1}$. Next the comparator compares the pixel values represented by the data bits at RI, $p_{1,2}$ and SI, $p_{1,2}$, then RI, $p_{1,3}$ and SI, $p_{1,3}$, etc., through the pixel values represented by the data bits at RI, $P_{M,N}$ and SI, $P_{M,N}$. Comparison is performed by subtracting the one pixel value from the other, with the result being stored in a matrix representing a difference image DI. If there is no change in the pixel values for a given location between reference image RI and subsequent image SI, a 0 value is stored in the appropriate address of the difference image matrix. Otherwise a value representing the difference is entered at the matrix location for the pixel values which have been compared.

Figure 3:
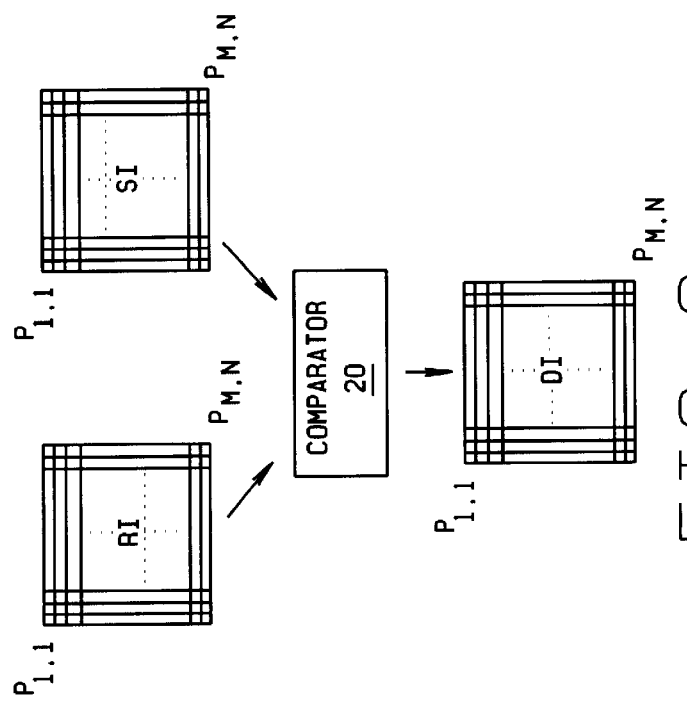
FIG. 3 illustrates a threshold detection and counting portion of the system.

Referring to FIG. 3, once a difference image DI is created by comparator 20, the difference image is supplied as an input to a threshold detector and counter 22 of processor 16. Each pixel value comprising the difference is now measured against a predetermined threshold value. The number of pixel values which equal or exceed the threshold are counted, and the count value is entered into a header H of what is now a processed difference image DI'. The processed difference image is stored in image storage 18 together with the other processed difference images. It will be apparent to those skilled in the art that other measures of image difference are possible rather than raw pixel count. For example, in JPEG compression schemes, each image is broken into blocks of K×K pixels and each block is compressed according to a predetermined process. Each block may be determined to have changed or not changed by performing the pixel comparison and thresholding on each block rather than on the entire image. The count of the number of blocks which have changed between the reference image and the subsequent image may then be stored in header H and used for searching the sequence of images. Other such variations are possible and do not alter the method of the present invention.

Figure 4:
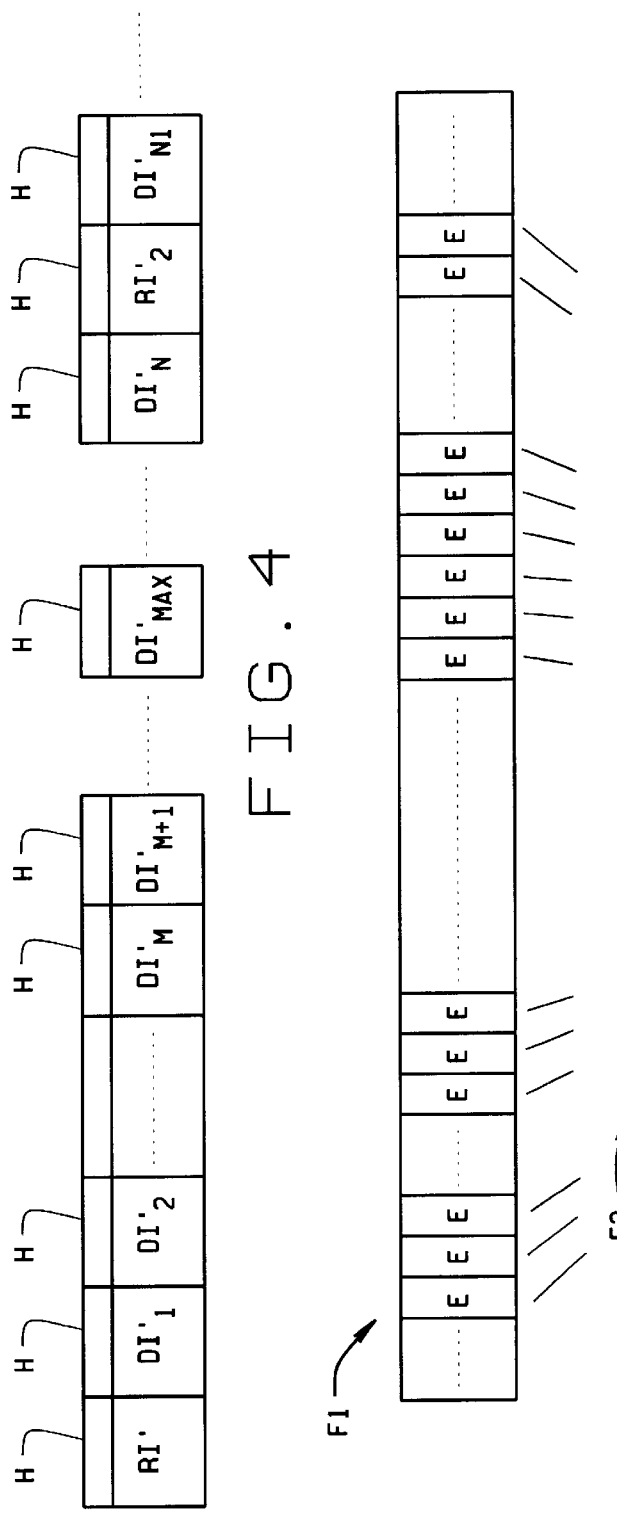
FIG. 4 is a simplified representation of the processed image contents stored by the system.

FIG. 4 is a simplified representation of a stored image file F1. The contents of file F1 are each reference image and each processed difference image $DI'_1$–$DI'_N$ stored in memory 18. Besides the contents of the image, each difference image also includes a header H which includes the information about how much of the image has changed since the last reference image. As described previously, this may be a raw count of pixels that have changed, a count of the image blocks that have changed, or other convenient measure of the difference between the reference and subsequent image. The header information may also contain other information to aid in processing the image sequence such as sequence number, type of compression, size of the image, etc. These details are immaterial to the present invention. For convenience, only the sequence of difference images between $RI_1$ and $RI_2$ is shown. Actual sequence files may contain many such sequences of reference and difference images. Alternatively, the sequences do not have to be stored as a single file but may be stored as multiple files with a means of associating the preceding and succeeding files in the sequence. In addition the header information may be appended to each image or may be stored separately. Those skilled in the art will recognize many such possible variations on the file structure.

Viewing of the stored data may be done at any time after the storage is performed. In between the storage and viewing, the sequence data may be transferred to another medium or sent across a communications channel to another device. Whether viewed locally at the same machine on which the data is stored or on another machine to which sequence data has been transferred, the viewing mechanism is dependent only on the file structure of the sequence and not the medium or machine on which it is viewed. The person viewing the video sequence need only have the proper software and/or hardware to read the sequence files, control the viewing of the sequence files, decode the sequence files, and display the resulting video, for example, on a computer monitor 24.

The method of the present invention is used in conjunction with the normal controls for viewing recorded video. There may be any of play, reverse play, fast forward, fast reverse, single step, reverse step, stop, slider selection, and other controls normally found on a DVR device. To use the method of the present invention, the operator sets the threshold via a threshold level control 26 on monitor 24 as a percentage or amount of change. The use of the threshold then is implemented in several ways. In one embodiment, when the operator commands any of the play, reverse play, fast forward, fast reverse, single step, or reverse step functions, the function will operate in the normal manner until such time that the operator pushes a seek control 34 that causes the view to skip to the next image which exceeds the previously set threshold as determined by examining the header H of each image in the sequence file F1. The video will then continue to play normally from that point until such time as the operator pushes the seek control 34 again at which time the process will be repeated. It will be understood by those skilled in the art that the value set by the user can be changed from one time to another and the value set by the user at any one time determines the number of images which are displayed. That is, if the viewing threshold is set to a lower value, then a larger number of stored images will meet the viewing criteria than if the viewing threshold is set to a higher value.

In another embodiment, when the operator commands any of the play, reverse play, fast forward, fast reverse, single step, or reverse step functions the function will operate in a manner dependent on the setting of threshold level control 26. For example, in the fast forward mode the images from the sequence file F1 presented to the operator will be only those whose header H indicates that the image changes exceed the previously set threshold. If image $DI'_M$ is the first image in which the count threshold is exceeded, the system will rapidly access that image which is then displayed on screen 30 of the monitor. Then, subsequent images having image changes exceeding the threshold will be displayed in a rapid manner. In FIG. 4, this is represented by images $DI'_M$ to $DI'_{M+X}$. In this implementation, some of the adjacent difference images DI will be shown but others will not. Only those difference images DI whose header H exceed the threshold level control 26 setting are shown. The operator does not have to push the seek control 34 to skip sections which do not exceed the threshold, the video will play until the end of the file is reached. Threshold level control 26 on monitor 24 can be changed at any time and the new threshold will take effect immediately, causing a larger or smaller number of the difference images DI to be displayed as compared to the previous setting.

Figure 5:
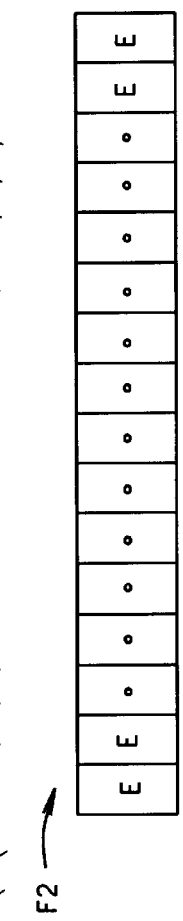
FIG. 5 illustrates an image file assembled from all the stored images in which a threshold count value is exceeded.

Alternatively, and as shown in FIG. 5, the stored image file F1 can be processed to produce a file F2, the contents of which include only those stored images E whose threshold count exceeds a predetermined value and the corresponding reference frames necessary to reconstruct the images. Thus, prior to viewing the file, when a user sets a threshold count value, processor 18 scans all of the stored files, locates those images which meet the count criteria, and assembles the file F2 with all of the selected images appearing in their time sequence. This file can now be viewed on monitor 24, or a separate memory file containing only those images is created for separate processing.

It will be understood that in addition to viewing images in their normal time sequence, they can also be viewed in reverse order. Additionally, the above described viewing controls allow the images to be viewed at the same rate at which they were generated, or at a different rate.

Figure 6:
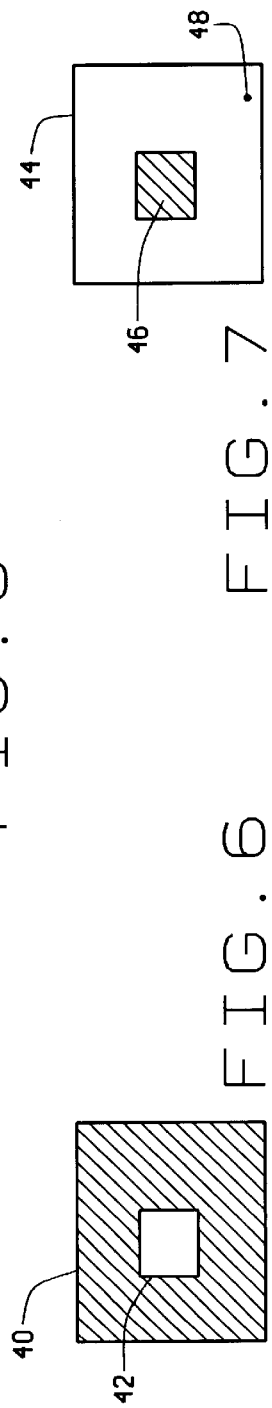
FIG. 6 illustrates a positive mask applied to an image as part of the processing; and, FIG. 7 illustrates a negative mask applied to the image.

The previously described embodiments of the invention can be modified to create new embodiments via the use of masks. FIG. 6 illustrates the use of a positive mask 42 applied to an image 40. It will be apparent to those skilled in the art that there are various ways to create the mask and that drawing tools can be provided on monitor 24. Mask 42 can be any arbitrary shape but is shown as a square region for convenience. The use of positive mask 42 applies the threshold level control 26 on monitor 24 only to the portion of the image within the mask. The header information H is formatted in such a way that the specific areas of the image which have changed are identified. The set threshold is then applied as a percentage or amount of change relative only to the area of the image represented by the mask. In this embodiment the same threshold setting that caused $DI'_M$ to $DI'_{M+X}$ to be played in the previous embodiment would cause only a subset $DI'_{M+L}$ to $DI'_{M+X-J}$ to be played where M+X–J>M+L. Those portions would be played that contain changes within the masked area above the threshold setting. It is apparent that the played images may not be contiguous just as in the previous embodiments.

Figure 7:

Another embodiment is the use of a negative mask 46 applied to image 44 as illustrated in FIG. 7. The same methods for creating the positive mask may be used to create the negative mask with a control 48 indicating whether the mask is to be positive or negative. Mask 46 can be any arbitrary shape but again is shown as a square region for convenience. The use of negative mask 46 applies the threshold level control 26 on monitor 24 only to the portion of the image outside the mask. This may be useful if there is an area within the image that is constantly changing, such as a window, that is not of interest. The header information H is formatted in such a way that the specific areas of the image which have changed can be identified. The set threshold is then applied as a percentage or amount of change relative only to the area of the image outside of the masked area. In this embodiment the same threshold setting that caused $DI'_M$ to $DI'_{M+X}$ to be played in the previous embodiment would cause only a subset $DI'_{M+I}$ to $DI'_{M+X-K}$ to be played where M+X–K>M+I. Those portions would be played that contain changes outside the masked area above the threshold setting. It is apparent that the played images may not be contiguous just as in the previous embodiments.

The masking embodiments may be applied to any of the previous embodiments including the embodiment in which it is necessary to command a jump to the next area where the threshold is exceeded, the embodiment in which the view automatically jumps to the next area where the threshold is exceeded, and the embodiment in which the scenes where the threshold is exceeded are written to a separate file for later review.

It will be further understood by those skilled in the art that any of the previous embodiments may be employed in a completely automatic manner such that no operator intervention is required. A particular embodiment is to apply a fixed threshold to an image sequence file in an automatic fashion to produce an image file containing only images which have changes exceeding the threshold either in a masked or unmasked manner. In this way, many such files may be processed automatically to reduce the total storage space required or for subsequent quick review. The threshold may in turn be automatically adjusted in increments or separate masks applied such that multiple versions of the same file are produced. Those skilled in the art will recognize that many such variations are possible which follow from the embodiments described herein.

What has been described is a method of scanning recorded video images of a scene to locate those images obtained over some period of time and in which there is a predetermined amount of recorded activity. One image is a reference image of the scene and other images are compared this reference. Difference images are created for each comparison and these are stored in a memory. When the images are to be viewed, a threshold test is applied to each determine if the amount of activity in an image is significant or not. Only those images meeting the test are then displayed, or a separate file including only those images is created.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A method of rapidly reviewing recorded video images of a scene to locate those images in which a predetermined amount of activity has occurred, comprising:

obtaining a plurality images of a scene over a period of time, one of the images being a reference image of the scene;

comparing the reference image with other images of the scene and creating a difference image for each comparison, the difference image comprising a set of values representing a change, if any, between corresponding pixels in the respective images;

performing a threshold test on the contents of the difference image to determine the number of difference image contents exceeding a predetermined threshold and counting that number;

storing the images and threshold test results in a memory; and, subsequently viewing selected stored images including:

setting a value representative of the amount of activity occurring in an image before it is displayed for viewing;

reviewing the stored images and identifying those having threshold test results which equal or exceed the value; and, displaying the identified images, setting of the value and reviewing the threshold test results for the images allowing a large number of images to be rapidly reviewed without having to view the images in their sequential order thereby saving a substantial amount of time while allowing the user to quickly locate pertinent information related to activities at the scene.

2. The method of claim 1 wherein the identified images are displayed in their temporal sequence.

3. The method of claim 1 further including creating a separate file of the stored images identified as having threshold test results which equal or exceed the value.

4. The method of claim 3 wherein the images stored in the separate file are also stored in their temporal sequence.

5. The method of claim 1 wherein images of the scene are obtained using an imaging means including a camera operating in the visible portion of the light spectrum.

6. The method of claim 4 wherein the imaging means includes an infrared if camera.

7. The method of claim 5 wherein the images obtained from the viewing means are analog signals and the method includes converting the analog signals to digital signals.

8. The method of claim 1 wherein the memory means includes a computer memory.

9. The system of claim 8 wherein the memory means further includes a disc memory.

10. The method of claim 1 wherein the identified images are displayed in reverse temporal sequence.

11. The method of claim 1 wherein the images are displayed at the rate at which they were generated.

12. The method of claim 1 wherein the images are displayed at a rate other than that at which they were generated.

13. The method of claim 1 wherein the display device contains a control to manually instruct the display device to skip to the next image which exceeds the threshold.

14. The method of claim 1 wherein the display device automatically skips to the next image which exceeds the threshold.

15. The method of claim 1 further including applying a positive mask to the image such that only the portion of the image within the mask is considered for purposes of skipping to the next image.

16. The method of claim 15 further including applying a negative mask to the image such that only the portion of the image outside the mask is considered for purposes of skipping to the next image.

17. The method of claim 1 wherein the identification of the portions of the image that have changed is stored in such a way that portions of the image may be searched independently of other portions.

18. The method of claim 3 wherein the searching is done in an automatic method without need of operator intervention.

19. A image processing system for monitoring a scene comprising:

imaging means for obtaining a plurality images of the scene, one of the images being a reference image of the scene and each image obtained being represented by an analog signal;

converter means converting the analog signals to digital signals;

signal processor means including a comparator comparing the reference image with other images of the scene and creating a difference image for each comparison, each difference image comprising a set of values representing a change, if any, between corresponding pixels in the respective images, means performing a threshold test on the contents of the difference image to determine the number of difference image contents exceeding a predetermined threshold and counting that number, and memory means for storing the images and the threshold test results; and, viewing means by which selected stored images can be subsequently viewed, the viewing means including means for setting a value representative of the amount of activity occurring in an image, the stored images being reviewed to identify those whose threshold test results equal or exceed the value, and a monitor for displaying the identified images, setting of the value and reviewing the threshold test results for the images allowing a large number of images to be rapidly reviewed without having to view the images in their sequential order thereby saving a substantial amount of time while allowing the user to quickly locate pertinent information related to activities at the scene.

20. The system of claim 19 wherein viewing means displays the identified images in their temporal order.

21. The system of claim 19 further including creating a separate file of the stored images identified as having threshold test results which equal or exceed the value.

22. The system of claim 21 wherein the images stored in the separate file are also stored in their temporal sequence.

23. The system of claim 19 wherein the imaging means includes a camera operating in the visible portion of the light spectrum.

24. The method of claim 1 wherein the identification of portions of an image which have changed be stored such that these portions of the image may be searched independently of other portions of the image.

25. The system of claim 19 wherein the identification of portions of an image which have changed be stored such that these portions of the image may be searched independently of other portions of the image.

* * * * *